July 13, 1954     P. C. HUTTON     2,683,380
GEAR WHEEL
Filed July 13, 1951     3 Sheets-Sheet 1
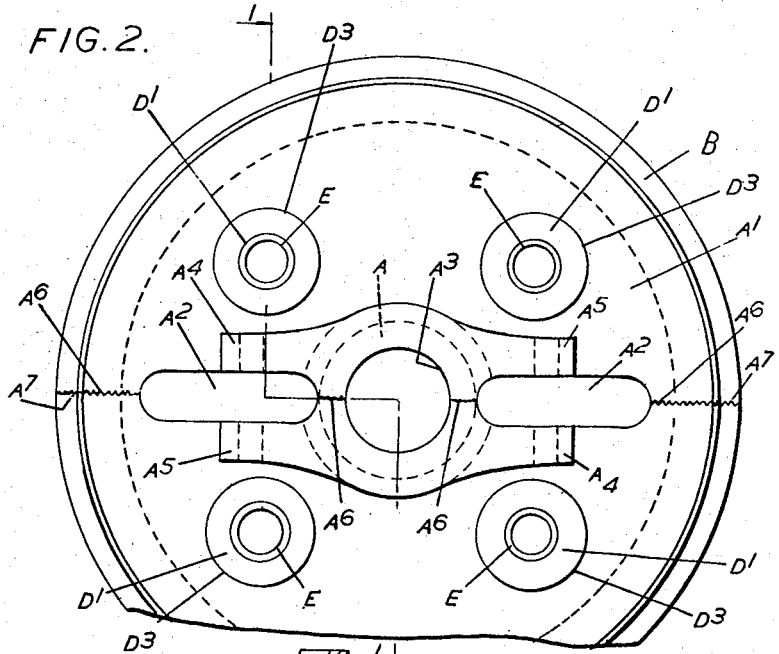
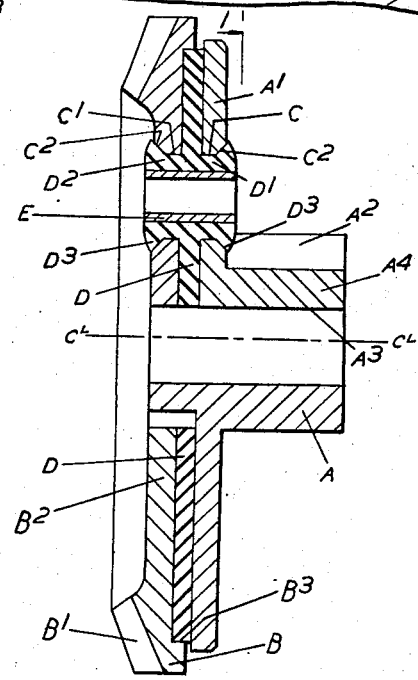
Inventor
PHILIP C. HUTTON
By Emery Holcombe & Blair
Attorneys

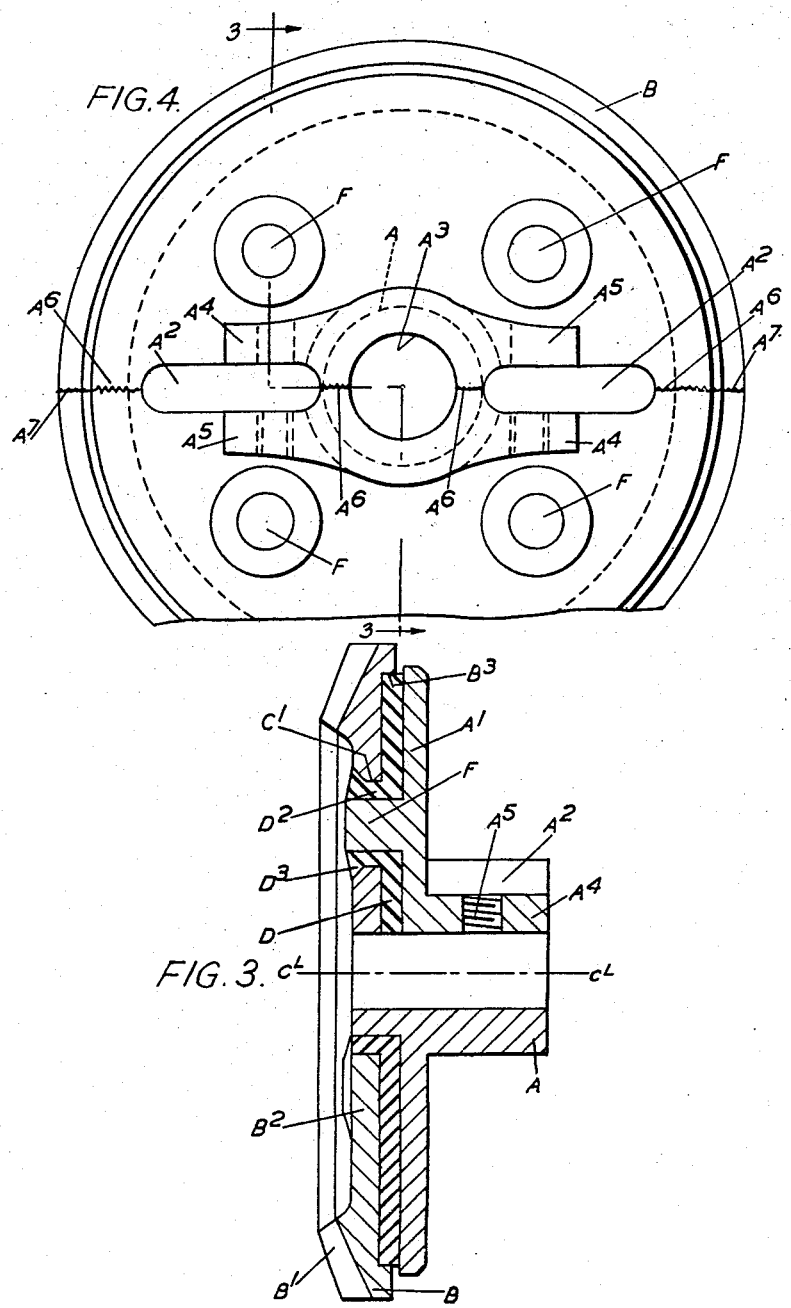

July 13, 1954     P. C. HUTTON     2,683,380
GEAR WHEEL
Filed July 13, 1951     3 Sheets-Sheet 3
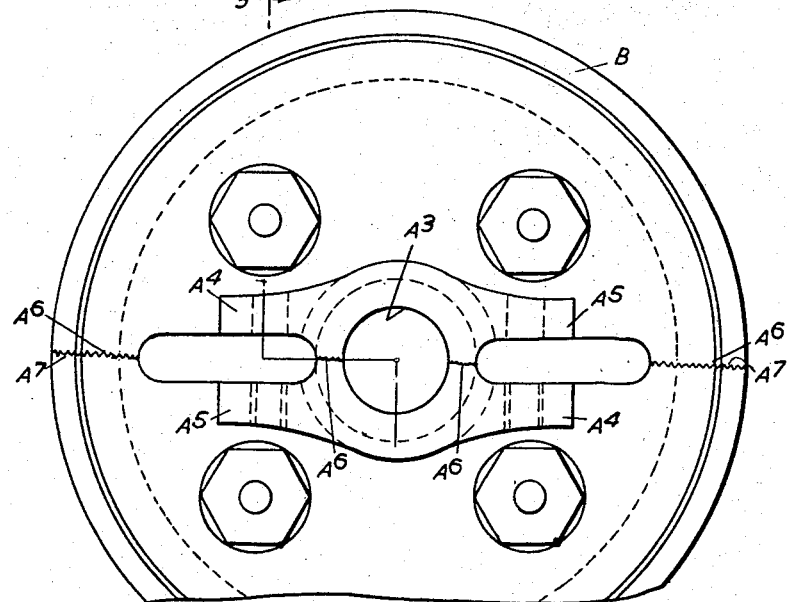
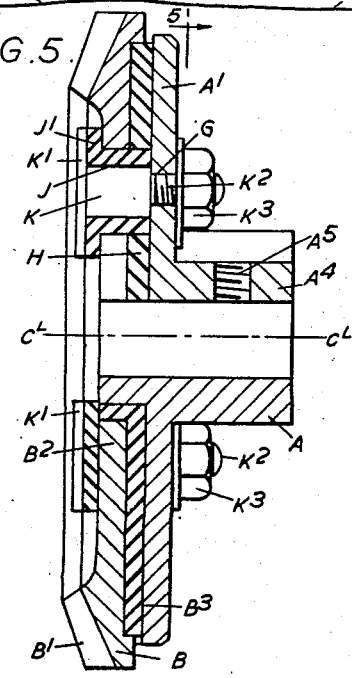
Inventor
PHILIP C. HUTTON
By Emery, Holcombe & Blair
Attorneys Patented July 13, 1954

2,683,380

UNITED STATES PATENT OFFICE 2,683,380

GEAR WHEEL

Philip Charles Hutton, London, England, assignor to Silentbloc Limited, London, England, a British company Application July 13, 1951, Serial No. 236,532

15 Claims. (Cl. 74—443)

This invention relates to gear wheels and is especially but not exclusively applicable to gear wheels of the bevel, hypoid or like type for transmitting a drive between two rotary members whose axes lie at right angles to one another. The invention is moreover especially but not exclusively applicable to gear wheels intended to transmit relatively light loads, for example the gear wheels for driving the spindles and other parts of textile machines, and one of the objects of the invention is to provide gear wheels which, while being capable of being cheaply produced and having the necessary strength and rigidity to transmit the loads for which they are intended, will, particularly when used in large numbers and not in a highly finished form, as for example in roving frames and spinning frames, tend to reduce the noise at present experienced in such cases.

The invention thus has for its object to provide a form of gear wheel assembly which may be used with advantage in certain cases instead of gear wheel assemblies of the kind forming the subject of U. S. patent application Ser. No. 236,531.

A gear wheel assembly according to the present invention comprises a hub portion and a tooth-carrying portion (hereinafter called the toothed portion) having parts formed with faces which lie opposite to one another and are spaced from one another in a direction parallel to the axis of the gear wheel (hereinafter called the axial direction), a pad or series of circumferentially spaced pads of rubber arranged between the two faces and acting as a distance piece or distance pieces to maintain them at the correct distance apart, and two or more rubber bushings arranged with their axes parallel to but displaced from the axis of rotation of the gear wheel and each serving in conjunction with a rigid core member lying within the bushing to transmit torque between the two parts of the gear wheel and to connect the two parts in a manner such as to hold the faces referred to in close contact with the rubber pad or pads.

Thus the principal function of the rubber pad or pads is to maintain the two parts of the gear wheel in correct spaced relationship to one another while isolating them from direct metal to metal contact, while the function of the rubber bushings is to transmit torque between the two parts and to serve in conjunction with the core members to hold the parts of the assembly together.

In one convenient arrangement according to the invention the hub portion has a disc-like flange projecting radially outwards from it while the toothed portion is in the form of a toothed ring having an annular flange projecting radially inwards from it and spaced axially from the flange on the hub portion, a disc of rubber being interposed between the adjacent faces of the two flanges to act as a pad or distance piece while two or more rubber bushings are provided each passing through a hole in at least one of the flanges and having a pin or equivalent core member therein by which torque can be transmitted from the other flange, the bushing and pin serving alone or in association with other parts both to hold the two flanges in close contact with the rubber disc and to transmit torque from one flange to the other. In one such arrangement each rubber bushing passes through holes in the two flanges and is radially compressed by a pin or the equivalent core member which is inserted into it after the ends of the bushing have been inserted in the holes in the flanges and serves to spread the ends of the bushing which project beyond the outer faces of the flanges so that these ends are enlarged and the bushing thus acts after the manner of a flexible hollow rivet connecting the flanges. In such a case each bushing may be formed integral with or separately from the rubber disc and, when formed integral with such disc, will be constituted, as will be apparent, by two coaxial hollow cylindrical bosses projecting from opposite faces of the disc.

In an alternative arrangement each bushing may pass through a hole in one only of the flanges and may be engaged by a pin lying within it and rigidly secured to the other flange. In this case the pin may serve merely to compress the bushing radially and spread its outer end after the manner of a rivet or may have a head which bears on the outer end of the bushing, which projects beyond the outer face of the adjacent flange, and causes it to bear on the adjacent outer face of the flange. In this case moreover the outer end of each bushing may be enlarged either by the radial stretching action of the pin and the axial compression only or may have a flange of rubber formed on it and lying between the head of each pin and the adjacent face of the adjacent flange.

One particularly useful application of the invention is to so-called split gear wheels as used on spinning frames, that is to say gear wheels which are formed in two semi-circular parts separated in a diametral plane containing the axis of the gear wheel so that they can be removed from and clamped to a shaft without dismantling the shaft in cases where the gear wheel cannot be slid on to the end of a shaft. Such gear wheels are generally at present manufactured initially in one piece with a weakened diametral line formed for example by two diametrically opposite radial slots with additional weakening following the lines of the tooth roots lying most nearly in line with the slots, the wheels being broken along these weakened lines after manufacture so that when again united the broken surfaces exactly mate with one another to form what is in effect a complete gear wheel.

When the present invention is applied to gear wheels of the split type, both the hub and the toothed portion are conveniently formed with weakened lines so that after manufacture they can be split in the general manner indicated above, while the rubber pad or pads are divided into two parts or sets each associated with one half of the complete gear wheel and the rubber bushings are of such number and so placed that each half of the gear wheel includes at least one bushing and preferably at least two bushings. As in the known split gear wheels of the kind referred to the hub portion of a split gear wheel according to the present invention conveniently includes a boss with pairs of radially projecting lugs extending along opposite sides of the weakening slots or lines, each pair of lugs being drilled to receive a bolt so that the bolts, when passed through the pairs of lugs and tightened, will draw the lugs towards one another and firmly unite the two halves of the gear wheel. In addition the hub will normally be provided with a radial screwthreaded hole adapted to receive a set screw so that, after the two halves of the gear wheel have been assembled and clamped together on opposite sides of the shaft to which the gear wheel is to be applied, the set screw can be screwed down to lock the gear wheel as a whole firmly to the shaft.

The invention may be carried into practice in various ways but three constructions of gear wheel according to the invention are illustrated by way of example in the accompanying drawings, in which, Figure 1 is a sectional side elevation of one form of gear wheel according to the invention on the broken line 1—1 of Figure 2, looking in the direction of the arrows.

Figure 2 is a face view of the gear wheel shown in Figure 1,

Figure 3 is a similar view to Figure 1 on the line 3—3 of Figure 4, of an alternative form of gear wheel according to the invention, Figure 4 is a face view of the gear wheel shown in Figure 3, Figure 5 is a similar view to Figure 1 on the line 5—5 of Figure 6 of a further alternative form of gear wheel according to the invention, and Figure 6 is a face view of the gear wheel shown in Figure 5.

In the construction shown in Figures 1 and 2 the gear wheel comprises a hub portion including a boss A from one end of which extends radially outwards a flange $A^1$ lying in a plane normal to the axis of the boss. The boss is formed with two diametrically opposite radially projecting lugs into each of which extends a radial slot $A^2$ which passes axially not only through the lug but also through the flange $A^1$ from a point slightly displaced radially outwards from the bore $A^3$ of the boss A to a point somewhat displaced radially inwards from the circumference of the flange $A^1$ so that each lug in effect constitutes a pair of lugs $A^4$, $A^5$ separated by one of the slots $A^2$.

The hub portion A, $A^1$ is initially made in one piece, as by casting, and it will be seen that the slots $A^2$ constitute a diametrically extending weakened line. The hub portion is then broken along this line as indicated by the break line $A^6$ so that the two halves can be separated and then assembled and clamped about a shaft by means of bolts passing through holes in the lugs $A^4$, $A^5$ as in known split gear wheels. For convenience of illustration the two halves of the hub part A, $A^1$ are shown in their assembled condition but the clamping bolts passing through the lugs $A^4$, $A^5$ are omitted.

Connected to the hub portion A, $A^1$ of the gear wheel in a manner hereinafter described is a toothed portion comprising a toothed rim B carrying teeth $B^1$ of the bevel or hypoid type, from which rim extends inwards a flange $B^2$ lying in a plane normal to the axis of rotation of the gear wheel. This toothed portion B, $B^1$, $B^2$ as a whole is formed, as by casting, with a diametral weakened line formed by two diametrically opposite aligned radial slots similar in form and disposition to the slots $A^2$ and lying directly behind the slots $A^2$ in Figure 2 and by two weakening grooves formed adjacent to the outer ends of the slots in the back of the flange $B^2$ and each following the contour of the root or groove lying between two adjacent gear teeth $B^1$. The toothed portion B, $B^1$, $B^2$ is then broken along the weakened line thus formed as indicated at $A^7$, the break in the toothed rim following the contour of the roots in question, that is to say being located on an inactive part of the surface of the teeth.

The rear face of the flange $B^2$ is provided with a recess so as to provide a circumferential rim $B^3$ the diameter of which is, as shown, slightly less than the outer diameter of the flange $A^1$. Formed in each of the flanges $A^1$ and $B^2$ are four axially extending holes C, $C^1$ of the same diameter as one another, each hole, C, in the flange $A^1$ being coaxial with a hole $C^1$ in the flange $B^2$ and each of the holes C and $C^1$ being provided with a chamfer $C^2$ at its outer end, as shown.

Interposed between the adjacent faces of the flanges $A^1$ and $B^2$ so as to lie within the rim $B^3$ is a disc D of rubber constituting a pad which serves to space the flanges from one another, this disc being formed in two circumferential halves separated along the line $A^6$, $A^7$ along which the metal parts of the gear wheel are broken.

Formed integral with each half of the rubber disc D are two hollow bushings each constituted by a pair of coaxial hollow bosses $D^1$, $D^2$ projecting from opposite faces of the disc D through an aligned pair of the holes C, $C^1$. Inserted into each bushing $D^1$, $D^2$ is a rigid tubular pin E which radially compresses the bushing and serves to cause the ends of the bushing to spread into the chamfers $C^2$ and embrace the outer faces of the flanges $A^1$ and $B^2$ as shown at $D^3$.

It will thus be seen that each of the hollow bushings $D^1$, $D^2$ acts in effect as a flexible hollow rivet serving to draw the flanges $A^1$ and $B^2$ towards one another and thus maintain them in close contact with the faces of the disc D and also serving as flexible members for transmitting torque between the flanges $A^1$ and $B^2$.

In the alternative construction shown in Figures 3 and 4 the form of the toothed rim portion B, $B^1$, $B^2$ is the same as in the construction shown in Figures 1 and 2 while the form of the hub portion is the same as that of the hub portion A, A¹ in the construction shown in Figures 1 and 2 except that instead of the flange A¹ being formed with four holes C it is formed with four axially projecting rigid pins F. In this construction also the form of the disc D is the same as in Figures 1 and 2 except that the hollow bosses D¹ are omitted. Thus, as will be clear from Figures 3 and 4 the complete gear wheel is assembled by placing the disc D in position on the rear face of the flange B² with the hollow bosses D² in position within the holes C¹ and then pressing the flanges A¹ and B² towards one another so that the pins F are forced into the bores of the bosses D² so as to compress these bosses radially and cause their ends to spread into the chamfers C² as shown at D³, whereby the parts of the gear wheel are united in a manner such that the flanges A¹ and B² tend to be held comparatively rigidly in their correct spaced relationship by the disc D while the pins F act in conjunction with the bosses, D² to transmit torque between the flanges A¹ and B² in a manner providing a suitable degree of flexibility. It will be understood that the pins F will be held within the bosses D² by a considerable frictional force.

In the further alternative construction shown in Figures 5 and 6 the form of the toothed rim portion B, B¹, B² is the same as in the construction shown in Figures 1 and 2 while the form of the hub portion is similar to that of the hub portion A, A¹ in the construction shown in Figures 1 and 2 except that instead of the holes C comparatively small screwthreaded holes G are formed in the flange A¹. In this construction instead of a rubber disc D formed integral with bosses D¹, D² a disc H of rubber, formed in two semi-annular parts is arranged between the adjacent faces of the flanges A¹ and B², this disc being provided with holes lying coaxial with the holes C¹ in the flange B² and serving to accommodate the rear ends of separate rubber bushings J which pass through the holes C¹, have flanges J¹ lying against the front face of the flange B² and are both axially compressed and radially expanded by means of bolt members K each of which engages the bore of one of the bushings J, has a head K¹ which bears on the outer face of the flange J¹ of such bushing, and is rigidly secured to the flange A¹ by means of a screw threaded end portion K² passing through one of the holes G and engaged by a nut K³.

In many cases the hub portion of a gear wheel structure according to the invention will be provided with a radial screwthreaded bore, as indicated at A⁵ in Figures 3 and 5 to receive a set screw by which it can be locked to a shaft on which it is mounted after its two halves have been assembled about such shaft.

It will be seen that in each of the constructions more particularly described above the rubber disc D or H serves in effect as a flexible distance piece locating the toothed portion of the gear wheel correctly relatively to the hub portion while the rubber bushings D¹, D² or J act in conjunction with their associated parts not only to hold the toothed portion and the hub portion in close contact with the rubber disc but also as flexible torque-transmitting members. It will be appreciated, however, that the transmission of torque, especially if the torque be light, may be effected largely through the disc D or H by reason of the friction between the faces of the disc and the flanges A¹ and B².

Further, although the word "rubber" has been used in the present specification for convenience, it is to be interpreted as including similar resilient materials such as so called synthetic rubbers.

What I claim as my invention and desire to secure by Letters Patent is:

1. A gear wheel assembly comprising a hub portion and a tooth carrying portion having parts formed with faces which lie opposite to one another and are spaced from one another, at least one of said parts having at least two axially extending circumferentially spaced bores therethrough, at least one pad of rubber or like resilient material disposed between the said faces and acting as a distance piece to maintain them at a predetermined distance apart, bushings of rubber or like resilient material extending through the said bores and having parts at their ends remote from the pad which are of larger external diameter than the bores and serve to embrace the hub and tooth carrying portions and press their said faces resiliently towards one another, and rigid cores lying within the bushings and serving to expand them radially to fit tightly within the said bores.

2. A gear wheel assembly comprising a hub portion having a disc-like flange projecting radially outwards therefrom, a toothed ring having an annular flange projecting radially inwards therefrom and spaced axially from the flange on the hub portion, at least one of said flanges having at least two axially extending circumferentially spaced bores therethrough, a disc of rubber or like resilient material lying between the adjacent faces of the two flanges and acting as a distance piece maintaining them at a predetermined distance apart, a bushing of rubber or like resilient material extending through each bore and having a part at its end remote from the disc of rubber or like resilient material which is of larger external diameter than the bore and serves to embrace and press the two flanges towards one another, and a rigid core member extending through each bushing and compressing it radially to fit tightly within the bore.

3. A gear wheel assembly as claimed in claim 2 in which the end of each bore remote from the disc of rubber or like resilient material is enlarged and the adjacent end portion of the bushing in each bore is maintained expanded into said enlargement by the rigid core member within it.

4. A gear wheel assembly comprising a hub portion having a disc-like flange projecting radially outwards therefrom, a toothed ring having an annular flange projecting radially inwards therefrom and spaced axially from the flange on the hub portion, each of the two flanges having at least two axially extending circumferentially spaced bores therethrough with each bore in one flange coaxial with one of the bores in the other flange and provided at its end remote from said other flange with an enlarged diameter portion, a disc of rubber or like resilient material lying between the adjacent faces of the two flanges and acting as a distance piece maintaining them at a predetermined distance apart, bushings of rubber or like resilient material extending through the bores, and rigid core members lying within the rubber bushings and maintaining them radially compressed within the bores and radially expanded so that their appropriate end portions are enlarged to lie within the enlarged diameter end portions of the bores to act after the manner of resilient hollow rivets drawing the flanges axially towards one another.

5. A gear wheel assembly as claimed in claim 4 in which the rubber or like bushings are formed integral with the rubber or like disc.

6. A gear wheel assembly comprising a hub portion having a disc-like flange projecting radially therefrom, a tooth-carrying portion having an annular flange projecting radially inwards therefrom and spaced axially from the flange on the hub portion, one of the two flanges having a plurality of axially extending circumferentially spaced bores therein each having its end remote from the other flange enlarged in diameter, a plurality of axially extending circumferentially spaced pins constituting rigid core members rigid with the said other flange and extending freely through the said bores, a disc of rubber or like resilient material lying between the adjacent faces of the two flanges and maintaining them at a predetermined distance apart, and a bushing of rubber or like resilient material disposed in the space between each rigid core member and the bore in which it lies and radially compressed between said rigid core member and the surface of said bore and expanded by said rigid core member into the enlarged diameter end of said bore.

7. A gear wheel assembly as claimed in claim 6 in which the bushings and disc of rubber or like resilient material are formed integral with one another.

8. A gear wheel assembly as claimed in claim 7 in which the rigid core members are formed integral with the appropriate flange.

9. A gear wheel assembly as claimed in claim 2 in which each portion of the gear wheel is formed in two semi-circular parts capable of being separated along a diametral line, each part of one portion is connected to its corresponding part of the other portion by at least two of the bushings of rubber or like resilient material and means are provided for rigidly clamping the two parts of the hub portion to one another.

10. A gear wheel assembly as claimed in claim 9 in which the abutting surfaces of the two halves of each portion of the gear wheel structure are formed by irregular complementary surfaces and in which the rubber or like pad is pre-formed in two semi-annular parts.

11. A gear wheel assembly as claimed in claim 4 in which each portion of the gear wheel is formed in two semicircular parts capable of being separated along a diametral line, each part of one portion is connected to its corresponding part of the other portion by at least two of the bushings of rubber or like resilient material and means are provided for rigidly clamping the two parts of the hub portion to one another.

12. A gear wheel assembly as claimed in claim 6 in which each portion of the gear wheel is formed in two semi-circular parts capable of being separated along a diametral line, each part of one portion is connected to its corresponding part of the other portion by at least two of the bushings of rubber or like resilient material and means are provided for rigidly clamping the two parts of the hub portion to one another.

13. A gear wheel assembly as claimed in claim 2 in which the larger external end part of each bushing forms a continuous radial flange and each rigid core member has a head portion which bears on the outer face of said radial bushing flange and compresses said flange between said head and the adjacent face of the flange on the appropriate gear wheel portion.

14. A gear wheel assembly comprising a hub portion and a tooth carrying portion having parts formed with faces which lie opposite to one another and are spaced from one another, at least one of said parts having at least two axially extending circumferentially spaced bores therethrough, at least one pad of rubber or like resilient material disposed between the said faces and acting as a distance piece to maintain them at a predetermined distance apart, bushings of rubber or like resilient material extending through the said bores and each having parts at both ends which are of larger external diameter than the bores and serve to embrace the hub and tooth carrying portions and press their said faces resiliently towards one another, and rigid cores lying within the bushings and serving to expand them radially to fit tightly within the said bores.

15. A gear wheel assembly as claimed in claim 13 in which each portion of the gear wheel is formed in two semi-circular parts capable of being separated along a diametral line, each part of one portion is connected to its corresponding part of the other portion by at least two of the bushings of rubber or like resilient material and means are provided for rigidly clamping the two parts of the hub portion to one another.

References Cited in the file of this patent

UNITED STATES PATENTS

| Number | Name | Date |
|---|---|---|
| 287,711 | Ortman | Oct. 30, 1883 |
| 379,022 | Morgan | Mar. 6, 1888 |
| 430,818 | Atwood | June 24, 1890 |
| 470,953 | Scholfield | Mar. 15, 1892 |
| 643,134 | Hogeland | Feb. 13, 1900 |
| 1,141,097 | Alquist | June 1, 1915 |
| 1,393,610 | Candee | Oct. 11, 1921 |
| 1,735,229 | Baker | Nov. 12, 1929 |
| 2,093,420 | Creager | Sept. 21, 1937 |
| 2,270,583 | Forton | Jan. 20, 1942 |
| 2,429,008 | Wolfe | Oct. 14, 1947 |